March 23, 1965 W. J. LEWIS 3,174,386
INDICATING WASHER
Original Filed March 1, 1951

INVENTOR.
WARREN J. LEWIS.
BY
Attorney.

United States Patent Office 3,174,386
Patented Mar. 23, 1965

3,174,386
INDICATING WASHER
Warren J. Lewis, Mansfield, Ohio, assignor to Douglas Aircraft Company, Inc., Santa Monica, Calif., a corporation of Delaware
Continuation of application Ser. No. 213,447, Mar. 1, 1951. This application Dec. 18, 1962, Ser. No. 245,517
1 Claim. (Cl. 85—62)

This application is a continuation of my application Serial No. 213,447 filed March 1, 1951, now abandoned.

This invention relates to a stress indicating device which may be used to determine the tension applied to bolts, rods and the like at the time of their installation. The device is particularly useful for achieving proper tension in certain bolts as for instance in the case of expansion bolts, the use of which is increasing in mines for the supporting of the roof in place of the cumbersome wood or metal overhead beams and the upright supports for the same.

One of the principal objects of this invention is to provide means for indicating quite accurately the tension produced in a bolt as the same is tensioned. This is quite important where the stresses in the bolt are high, and is especially important in the case of expansion bolts installed in the roof of mines.

At the present time, the tension placed on the bolt or stud is determined by what is known as a torque-wrench by which the torque required to tighten a nut is measured.

The actual tension to which the bolt is subjected is not that shown by the torque-wrench but varies considerably therefrom. This may be due to tight or dirty threads, dirt between the flat faces subject to relative rotation in tightening the nut and to the lubricating properties of the oil, if used, etc.

Another object is to provide means for indicating the grip or holding capacity of the bolt with respect to the wall of the hole in which the bolt is installed, in case the bolt is of the expansion type such as shown in application for U.S. Patent, Serial No. 193,170, filed October 31, 1950 now Patent No. 2,625,071.

The herein disclosed device is intended to give a direct indication when the tension in the bolt has reached a predetermined value, and is free of those conditions mentioned above which affect the results shown by a torque-wrench.

The device is positioned between the bolt head or nut and the supporting member and surrounds the bolt or stud.

By properly constructing the device as to dimensions and material, the device may be made to indicate when a predetermined tension has been reached in the bolt or stud. To accomplish this the device is constructed to collapse or buckle when the compressive force thereon has reached the limit of tension desired in the bolt or stud.

A device of this nature will indicate accurately when the tension in the bolt has reached the predetermined value; the compression force on the device will be equal to the tension in the bolt.

The device is one which will indicate not only when the tension in the bolt or stud has reached a predetermined value but which will also hold that tension in the bolt or stud insofar as the device may affect the same and which will not materially increase the space between the nut or bolt head and the bearing member supported by the bolt.

As an example of the herein disclosed device,

The device comprises a compressive column 1, intermediate the flanges 2 and 3. All axial surfaces are straight and all sections normal thereto are circular.

The device is made preferably of mild steel, but can be formed of high strength non-ferrous metals. In the case a ferrous material is used, it has been found advantageous to coat the device with cadmium, especially the bearing surfaces 4 and 5, as the friction is considerably reduced between the relatively movable parts.

In case of very heavy tension loads, and depending upon the resistance to crushing of the column 1, the wall of the column may be so thick that the flanges 2 and 3 will not be necessary.

In constructing the device of a high resistance material the thickness of a wall of the column 1 may be quite thin and hence the flanges 2 and 3 will be quite necessary but it is not necessary to have them project inwardly from the surface 6 of the column, thereby making a much simpler and more economical device to manufacture.

The inner diameter of the column is usually made to give a small clearance between it and the bolt and the flanges are thicker than the wall of the column 1.

When a compressive force is applied axially to the device, the column will collapse or buckle when the compression force applied reaches the ultimate resistance of the column.

In order to keep the height or thickness of the device as small as reasonably possible, the column is of such height that when it collapses, there will be formed a single crimp 7.

This crimp will always extend outward and not inward, therefore, the inner diameter of the device will not be decreased.

Figure 1:
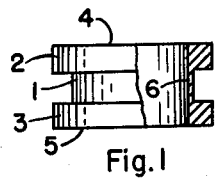
FIG. 1 is a side view in partial section of an indicating device and is substantially to dimensions of a device registering an ultimate resistance to collapsing or buckling of about 8800 pounds.
Figure 2:
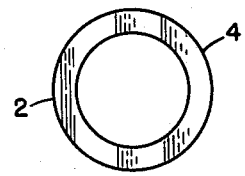
FIG. 2 is a full top view of FIG. 1.

As an example, take a device made of a mild steel according to FIGS. 1 and 2 for a ¾ inch bolt; diameter of column 1, inside ⅞ inch, outside 15/16 inch and height between flanges, ¼ inch, thickness of flanges 3/16 inch; resistance to buckling 8800 pounds. Tension in bolt when device buckles will be 8800 pounds.

Figure 3:
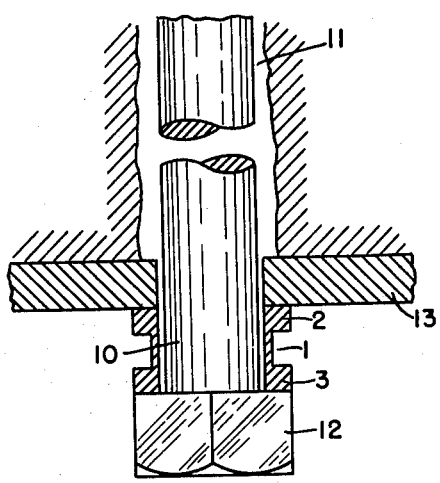
FIG. 3 shows a partial installation of an expansion bolt in a mine roof; the expanding member being anywhere from two to six feet within the opening; pressure sufficient to collapse the indicating device has not as yet been applied.

Assume now the above device is assembled on an expansion bolt with a ¾ inch stud 10 and the assembly positioned in an opening 11 in a mine roof (the expandable shell being several feet from the face of the mine roof) as shown in FIG. 3.

The operator 4 applies a wrench to the bolt head 12 or nut and rotates same clockwise. The upper end of the expansion bolt will spread and grip the wall of the opening and the tendency thereafter will be to increase the grip of the expanding shell against the wall of the opening 11 and simultaneously draw the bolt upwardly and the head 12 against the device and force the device against the bearing plate 13.

As rotation is continued, the said grip and the tension in the bolt will increase until the compressive force upon the device has reached its ultimate resistance to buckling at which point the tension in the bolt will be equal to the compressive resistance to buckling of the device. At all times the compressive force sustained by the device is exactly equal to the tension in the bolt 10.

Figure 4:
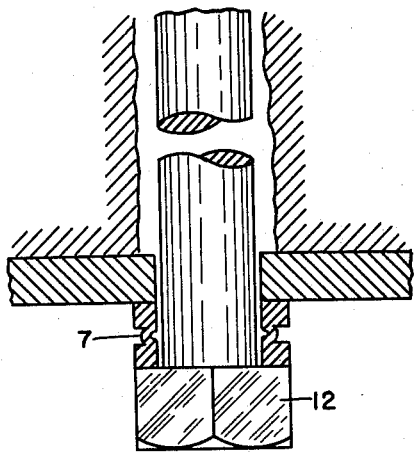
FIG. 4 is similar to FIG. 3 but a tension equal to the collapsing resistance of the indicating device has been applied by rotating the bolt head.

When the ultimate compression force upon the device has been reached, the column 1 will buckle as shown in FIG. 4.

Rotation of the bolt may be continued, thus flattening out the crimp 7, without increasing the tension in the bolt, but when the crimp has been flattened, rotation of the bolt should cease as further rotation will then increase the tension in the bolt beyond the ultimate yielding capacity of the device.

Having fully collapsed the device, the same will act as a solid washer.

The manipulator of the bolt can readily tell when the device starts to collapse from observation and by the same reason can tell when the crimp 7 has been fully collapsed so that there is little danger of over stressing the bolt beyond the capacity of the device.

The use of the indicating device avoids the use of a torque-wrench which does not give a direct reading of the tension in the bolt, due as before stated, to thread fit and roughness, lubrication, dirt between threads and bolt head, etc., but the herein described device gives the true tension in the bolt.

In an expansion bolt, the enlarged member 12 is usually formed integral with the bolt shank, but the member 12 may be in the form of a threaded nut and the indicating washer may be used with either form of bolt.

I claim:

Installation tension indicating means for fasteners of that type which includes elongate connecting means connectively passing through surfaces to be united and terminated oppositely by axial-pressural members, comprising: washer means disposed coaxially adjacent said connecting means between the one of said pressural members and the adjacent one of the surfaces to be connected, said washer means consisting mainly of an axial and radial expanse of solid compressively-plastic material that has a plastic yield strength less than that of any of the other parts of the fastener; said expanse being thereby adapted to plastically deform axially and radially under fastener tension and take a permanent plastic set so as to directly respond to and sense said tension, thereby to enable ascertainment therefrom of said tension; said expanse constituting a spacer and sensing member and comprising a simple, hollow right-cylinder having an axial extent considerably greater than that necessary to operatively space the adjacent pressural member from the adjacent one of the connected surfaces when the fastener is tightened, the excess extent of said cylinder having such a direct, pre-calibrated proportion to the predetermined installation tension of said fastener that when said cylinder is axially compressed by said pressural member sufficiently to eradicate said excess extent, the axial shortening of said cylinder sufficiently to eradicate said excess length exceeds the limiting elastic strain of the cylinder and effects indication of said predetermined tension.

References Cited by the Examiner
UNITED STATES PATENTS

| | | | |
|---|---|---|---|
| 994,892 | 6/11 | Tschudy | 85—50 |
| 1,994,388 | 3/35 | Ericksen | 73—141 |
| 2,464,152 | 3/49 | Ralston | 85—62 |
| 2,660,084 | 11/53 | Newman | 85—38 |
| 2,725,843 | 12/55 | Koski | 85—62 |

EDWARD C. ALLEN, *Primary Examiner.*